(12) United States Patent
Zhang et al.

(10) Patent No.: US 11,327,294 B2
(45) Date of Patent: May 10, 2022

(54) PROJECTION DEVICE

(71) Applicant: Qisda Corporation, Taoyuan (TW)

(72) Inventors: Jia-Ming Zhang, Taoyuan (TW); Ching-Shuai Huang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/148,904

(22) Filed: Jan. 14, 2021

(65) Prior Publication Data

US 2021/0223538 A1 Jul. 22, 2021

(30) Foreign Application Priority Data

Jan. 20, 2020 (CN) .......................... 202010065218.0

(51) Int. Cl.
| | |
|---|---|
| *G03B 21/14* | (2006.01) |
| *H04N 9/31* | (2006.01) |
| *G02B 26/08* | (2006.01) |
| *G03B 21/20* | (2006.01) |
| *G03B 21/28* | (2006.01) |
| *G02B 5/04* | (2006.01) |

(52) U.S. Cl.
CPC .......... *G02B 26/0833* (2013.01); *G02B 5/04* (2013.01); *G03B 21/2033* (2013.01); *G03B 21/28* (2013.01)

(58) Field of Classification Search
CPC .. G03B 21/14; G03B 21/008; G03B 21/2033; G03B 21/28; G02B 26/0833; G02B 5/04; H04N 9/31; H04N 9/3102
See application file for complete search history.

(56) References Cited

U.S. PATENT DOCUMENTS

| 10,139,713 | B2 * | 11/2018 | Guo ....................... G03B 21/20 |
| 10,353,281 | B2 * | 7/2019 | Okuda ................... G03B 33/12 |
| 2014/0022510 | A1 * | 1/2014 | Bausenwein .......... G03B 21/14 353/8 |
| 2018/0259839 | A1 * | 9/2018 | Okuda .................... G03B 33/12 |
| 2020/0021783 | A1 * | 1/2020 | Kawasumi ......... G02B 26/0833 |
| 2020/0183261 | A1 * | 6/2020 | Matsushita ........ G03B 21/2013 |
| 2020/0186762 | A1 * | 6/2020 | Takahashi ................ G09G 3/20 |

* cited by examiner

*Primary Examiner* — William C. Dowling

(57) ABSTRACT

A projection device for providing an image light includes a light source module configured to provide an illumination light, a dichroic film configured to allow a first portion of the illumination light to transmit therethrough to form a light in a first wavelength range and to reflect a second portion of the illumination light into a light in a second wavelength range different from the first wavelength range, a first digital micromirror device (DMD) configured to reflect the light in the first wavelength range from the dichroic film into a first light, and a second DMD configured to reflect the light in the second wavelength range from the dichroic film into a second light, wherein the first light and the second light together form the image light.

14 Claims, 12 Drawing Sheets

PROJECTION DEVICE

BACKGROUND OF THE INVENTION

1. Field of the Invention

The invention generally relates to a projection device. Particularly, the invention relates to a projection device having two digital micromirror devices.

2. Description of the Prior Art

Projectors are widely used in various occasions, such as schools, exhibitions or conferences to improve the convenience and variety of life. The imaging principle of a digital light processing (DLP) projector is generally to generate light by a light source, to modulate the light into multiple color light signals sequentially by rotating the color wheel, and then use a digital light processing element or chip to process the color light signals into image light signals, which are projected on the screen or wall by the lens to form an image. The color expression of the projected image of the projector directly affects the quality of the projected image. Therefore, how to improve the color reproducibility of the projector, and to improve the color light output (CLO) of the image is one of the important issues in developing a projector.

SUMMARY OF THE INVENTION

It is an object of the invention to provide a projection device, which utilizes two digital micromirror devices (DMDs) in a non-sequential light-split manner to improve the color brightness.

In an embodiment, the invention provides a projection device for providing an image light. The projection device includes a light source module configured to provide an illumination light, a dichroic film configured to allow a first portion of the illumination light to transmit therethrough to form a light in a first wavelength range and to reflect a second portion of the illumination light into a light in a second wavelength range different from the first wavelength range, a first digital micromirror device (DMD) configured to reflect the light in the first wavelength range from the dichroic film into a first light, and a second DMD configured to reflect the light in the second wavelength range from the dichroic film into a second light, wherein the first light and the second light together form the image light.

In an embodiment, the projection device further includes a first prism and a second prism, wherein the dichroic film is disposed between the first prism and the second film, and the illumination light is incident to the first prism, wherein the first portion of the illumination light transmits through the dichroic film to form the light in the first wavelength range, the light in the first wavelength range transmits out of the second prism and is reflected from the first DMD into the first light, and the first light is incident to the second prism, transmits through the dichroic film, and emits out of the first prism, and wherein the second portion of the illumination light is reflected from the dichroic film into the light in the second wavelength range, the light in the second wavelength range transmits through the first prism and reflected from the second DMD into the second light, and the second light is incident to the first prism, reflected from the dichroic film, and emits out of the first prism to form the image light with the first light.

In an embodiment, the projection device further includes at least one optical element, wherein the at least one optical element directs the illumination light to the first prism, and the at least one optical element includes one or more lenses, reflective mirrors, prisms, or a combination thereof.

In an embodiment, the light source module includes a light source configured to provide a first color light, a wavelength conversion unit configured to convert a portion of the first color light into a second color light, the first color light and the second color light falling in different wavelength ranges, and a light-combining element configured to combine the second color light and the first color light not converted by the wavelength conversion unit to form the illumination light.

In an embodiment, the projection device further includes a dichroic member configured to reflect the first color light and allow the second color light to transmit therethrough, wherein the first color light is reflected from the dichroic member to the wavelength conversion unit, and the second color light transmits through the dichroic member to be combined with the first color light not converted by the wavelength conversion unit at the light-combining element to form the illumination light.

In an embodiment, the light source module includes a first light source configured to provide a first color light, a first wavelength conversion unit configured to convert a portion of the first color light into a second color light, the first color light and the second color light falling in different wavelength ranges, a second light source configured to provide a third color light, a second wavelength conversion unit configured to convert a portion of the third color light into a fourth color light, the third color light and the fourth color light falling in different wavelength ranges, and a light-combining element configured to combine the first color light not converted by the first wavelength conversion unit, the second color light, the third color light not converted by the second wavelength conversion unit, and the fourth color light to form the illumination light.

In an embodiment, the projection device further includes a first dichroic member configured to reflect the first color light and allow the second color light and the fourth color light to partially transmit therethrough, and a second dichroic member configured to reflect the third color light and allow the fourth color light to transmit therethrough, wherein the first color light is reflected from the first dichroic member to the first wavelength conversion unit to generate the second color light, the second color light transmits through the first dichroic member to travel toward the light-combining element, and the first color light not converted by the first wavelength conversion unit transmits through the first wavelength conversion unit to travel toward the light combining element, and wherein the third color light is reflected from the second dichroic member to the second wavelength conversion unit to generate the fourth color light, the fourth color light transmits through the second dichroic member to travel toward the light-combining element, and the third color light not converted by the second wavelength conversion unit transmits through the second wavelength conversion unit to be reflected by the first dichroic member and the second dichroic member to the light-combining element.

In an embodiment, the projection device further includes a first dichroic member configured to reflect the first color light and allow the second color light and the fourth color light to partially transmit therethrough, and a second dichroic member configured to reflect the third color light and allow the fourth color light to transmit therethrough, wherein the first color light is reflected from the first dichroic member to the first wavelength conversion unit to generate the second color light, the second color light transmits through the first dichroic member to travel toward the light-combining element, and the first color light not converted by the first wavelength conversion unit is reflected from the first wavelength conversion unit to bypass the first dichroic member toward the light-combining element, and wherein the third color light is reflected from the second dichroic member to the second wavelength conversion unit to generate the fourth color light, the fourth color light transmits through the second dichroic member to travel toward the light-combining element, and the third color light not converted by the second wavelength conversion unit transmits through the second wavelength conversion unit to be reflected by the first dichroic member and the second dichroic member to the light-combining element.

In an embodiment, the first color light and the third color light fall in a same wavelength range with different polarities, and the second color light and the fourth color light fall in a same wavelength range.

In an embodiment, the projection device further includes a first dichroic member configured to reflect the first color light and allow the second color light and the fourth color light to partially transmit therethrough, and a second dichroic member configured to reflect the third color light and allow the fourth color light to transmit therethrough, wherein the first color light is reflected from the first dichroic member to the first wavelength conversion unit to generate the second color light, the second color light transmits through the first dichroic member to travel toward the light-combining element, and the first color light not converted by the first wavelength conversion unit transmits through the first wavelength conversion unit to be reflected from the first dichroic member toward the light-combining element, and wherein the third color light is reflected from the second dichroic member to the second wavelength conversion unit to generate the fourth color light, the fourth color light transmits through the second dichroic member and is then reflected from the dichroic member toward the light-combining element, and the third color light not converted by the second wavelength conversion unit is reflected from the second wavelength conversion unit to the first dichroic member and further reflected from the first dichroic member to the light-combining element.

In an embodiment, the light source module includes a first light source configured to provide a first color light, a first wavelength conversion unit configured to convert the first color light into a second color light, the first color light and the second color light falling in different wavelength ranges, a second light source configured to provide a third color light, a second wavelength conversion unit configured to convert a portion of the third color light into a fourth color light, the third color light and the fourth color light falling in different wavelength ranges, and a light-combining element configured to combine the second color light, the third color light not converted by the second wavelength conversion unit, and the fourth color light to form the illumination light.

In an embodiment, the projection device further includes a dichroic member configured to reflect the first color light and the third color light and allow the second color light and the fourth color light to partially transmit therethrough, wherein the first color light is reflected from the dichroic member to the first wavelength conversion unit to generate the second color light, and the second color light partially transmits through the dichroic member to travel toward the light-combining element, and wherein the fourth color light is partially reflected from the dichroic member toward the light-combining element, and the third color light not converted by the second wavelength conversion unit is reflected from the dichroic member to the light-combining element.

In an embodiment, the dichroic member is configured to reflect blue light and red light and allow green light to transmit therethrough, or configured to reflect blue light and green light and allow red light to transmit therethrough, and wherein the first color light and the third color light are blue lights, and the second color light and the fourth color light are yellow lights.

Compared to the prior art, the projection device of the invention utilizes two DMDs and the dichroic film to split light non-sequentially to enhance the color brightness of the image, and in turn to improve the ability of reproducing color and the image quality of the projection device.

DETAILED DESCRIPTION OF THE PREFERRED EMBODIMENT

Figure 1A:
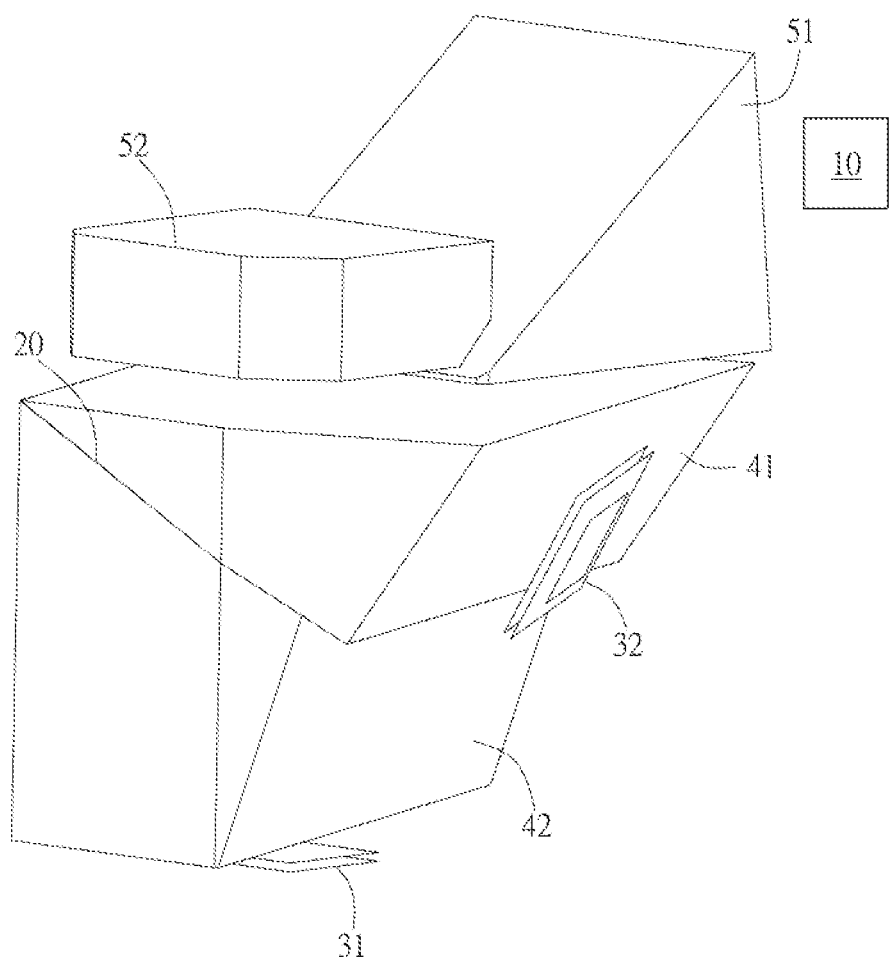
FIGS. 1A and 1B are schematic views of the projection device and the optical path of the projection device in an embodiment of the invention.
Figure 1B:
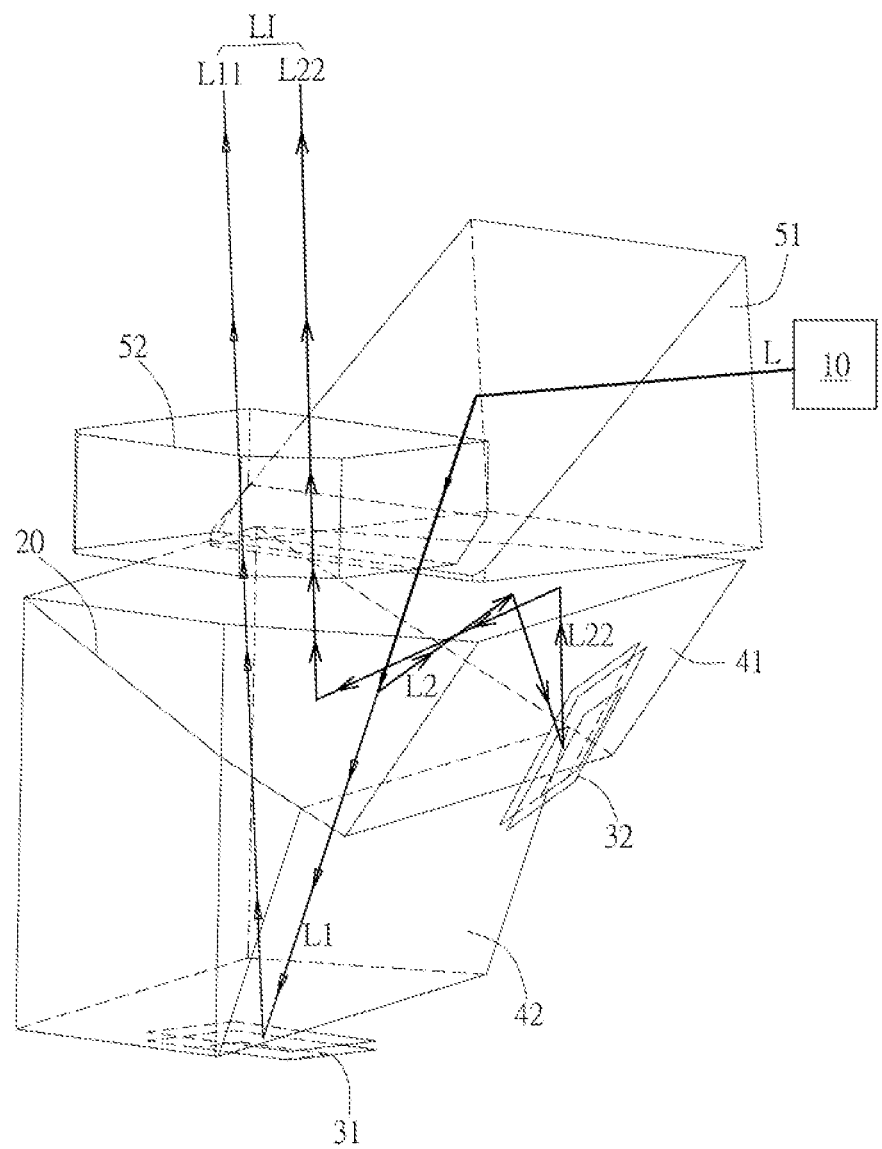

The invention provides a projection device, which is configured to provide an image light on a screen or a wall to form an image. As shown in FIGS. 1A and 1B, in an embodiment, the projection device includes a light source module (e.g., the light source module 10 of FIG. 3), a dichroic film 20, a first digital micromirror device (DMD) 31 and a second DMD 32. The light source module 10 is configured to provide an illumination light L. The dichroic film 20 is configured to allow a first portion of the illumination light L to transmit therethrough to form a light L1 in a first wavelength range and to reflect a second portion of the illumination light L into a light L2 in a second wavelength range, and the second wavelength range is different from the first wavelength range. The first DMD 31 is configured to reflect the light L1 in the first wavelength range from the dichroic film 20 into a first light L11. The second DMD 32 is configured to reflect the light L2 in the second wavelength range from the dichroic film 20 into a second light L22. The first light L11 and the second light L22 together form the image light LI.

Specifically, the light source module is preferably a light source or a modular component constructed by one or more light sources and one or more optical elements to provide the illumination light L. In an embodiment, the illumination light L is preferably a white light, but not limited thereto. Various embodiments of the light source module are illustrated in FIGS. 3 to 8 and will be described in detail later. In this embodiment, the light source module takes the light source module 10 of FIG. 3 as an example, but not limited thereto. In other embodiments, the light source module can be any of the light source module 10, 10A, 10B, 10C, 10D, or 10E of FIGS. 3 to 8.

The dichroic film 20 is an optical element, which allows lights of a specific wavelength range to transmit therethrough and reflects lights of another specific wavelength range. For example, the dichroic film 20 can be a beam splitter or a color filter, which has an optical coating on the light incident region according to required optical properties. In this embodiment, the dichroic film 20 preferably allows the light L1 in the first wavelength range to transmit therethrough and reflects the light L2 in the second wavelength range. In different embodiments, according to practical applications, the transmitting wavelength range and the reflecting wavelength range of the dichroic film 20 can be modified to achieve a desired optical effect, such as color projection. Taking lights of red, green, and blue colors as an example, the dichroic film 20 can be configured to (1) allow the red light to transmit therethrough and reflect the green light and the blue light, i.e., the light L1 in the first wavelength range is the red light, and the light L2 in the second wavelength range is the green light or the blue light, or (2) allow the green light to transmit therethrough and reflect the red light or the blue light, i.e., the light L1 in the first wavelength range is the green light, and the light L2 in the second wavelength range is the red light or the blue light, or (3) allow the green light and the blue light to transmit therethrough and reflect the red light, i.e., the light L1 in the first wavelength range is the green light or the blue light, and the light L2 in the second wavelength range is the red light, or (4) allow the red light and the blue light to transmit therethrough and reflect the green light, i.e., the light L1 in the first wavelength range is the red light or the blue light, and the light L2 in the second wavelength range is the green light, but not limited thereto.

Each of the first DMD 231 and the second DMD 232 is constructed by a plurality of micromirrors configured to selectively reflect light into the image light according to the image signal. The first DMD 231 and the second DMD 232 are respectively disposed corresponding to the dichroic film 20, so that the first DMD 231 is configured to reflect the light L1 in the first wavelength range, which is transmitted through the dichroic film 20, into the first light L11 of the image light LI, and the second DMD 232 is configured to reflect the light L2 in the second wavelength range, which is reflected from the dichroic film 20, into a second light L22 of the image light LI.

As shown in FIGS. 1A and 1B, the projection device may further include a first prism 41 and a second prism 42. The dichroic film 20 is preferably disposed between the first prism 41 and the second film 42, and the illumination light L is incident to the first prism 41. In an embodiment, the dichroic film 20 can be a dichroic or filter coating, which is applied to the first prism 41 or the second prism 42, so that the dichroic film 20 is located between the adjoining (or facing) prism surfaces of the first prism 41 and the second prism 42, but not limited thereto. In another embodiment, the dichroic film 20 is a light splitter or a color filter sandwiched between the first prism 41 and the second prism 42. The first prism 41 and the second prism 42 can be total reflection prisms and have any suitable configurations or shapes, not limited to the embodiment. As such, the illumination light L, the light L1 in the wavelength range, the light L2 in the second wavelength, the first light L11, and the second light L22 can travel along predetermined optical paths by reflection/refraction of the first prism 41 and/or the second prism 42.

Moreover, according to practical requirements and designed optical paths, the projection device can optionally include other optical elements to achieve a desired optical effect. The optical elements may include, for example, one or more lenses, reflective mirrors, prisms, or a combination thereof, but not limited thereto. The optical elements can be properly disposed in the optical path and configured to direct the illumination light L from the light source module 10 to the dichroic film 20 or to direct the first light L11 and the second light L22 to the outside of the projection device. For example, the optical element 51 (e.g., prism) is disposed at the upstream of the optical path with respect to the first prism 41 and configured to direct the illumination light L from the light source module 10 to the dichroic film 20, and the optical element 52 (e.g., lens) can be disposed at the downstream of the optical path with respect to the dichroic film 20 and configured to direct the first light L11 and the second light L22 reflected from the first DMD 31 or the second DMD 32 out of the projection device, but not limited thereto. The number and the disposing locations of the optical elements can be modified according to the practical applications and not limited to the embodiments.

Figure 2A:
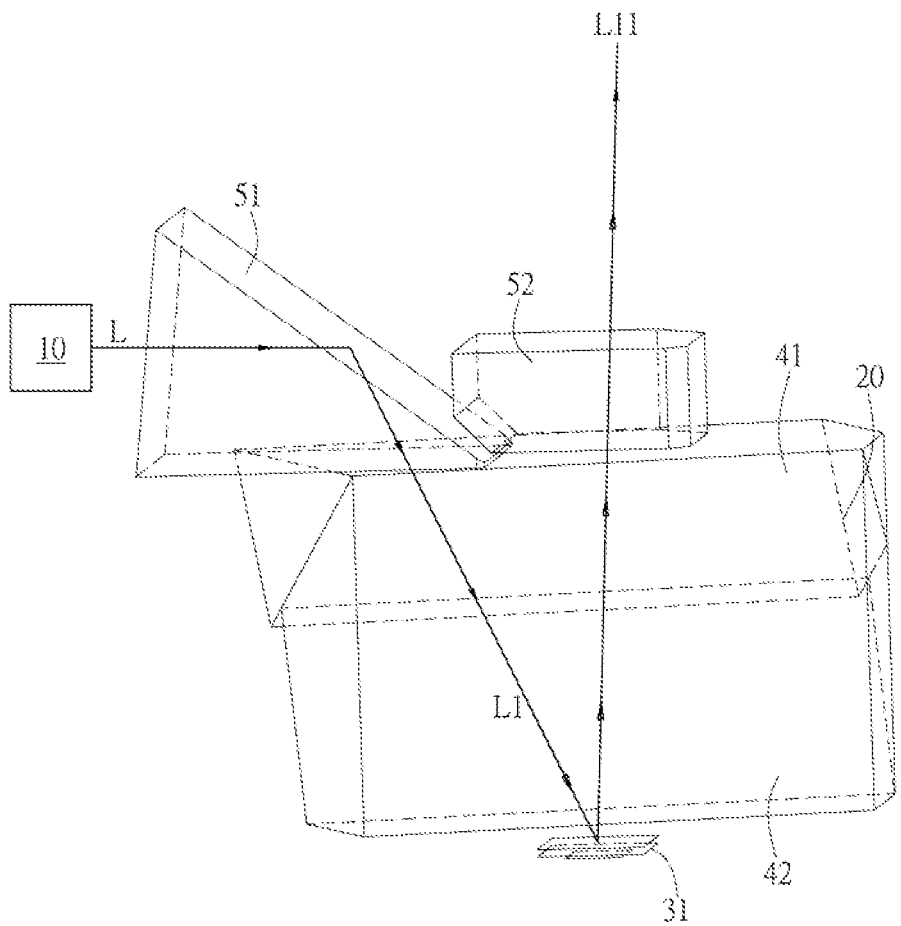
FIGS. 2A and 2B are schematic views of the first optical path and the second optical path of the projection device of FIG. 1B.
Figure 2B:
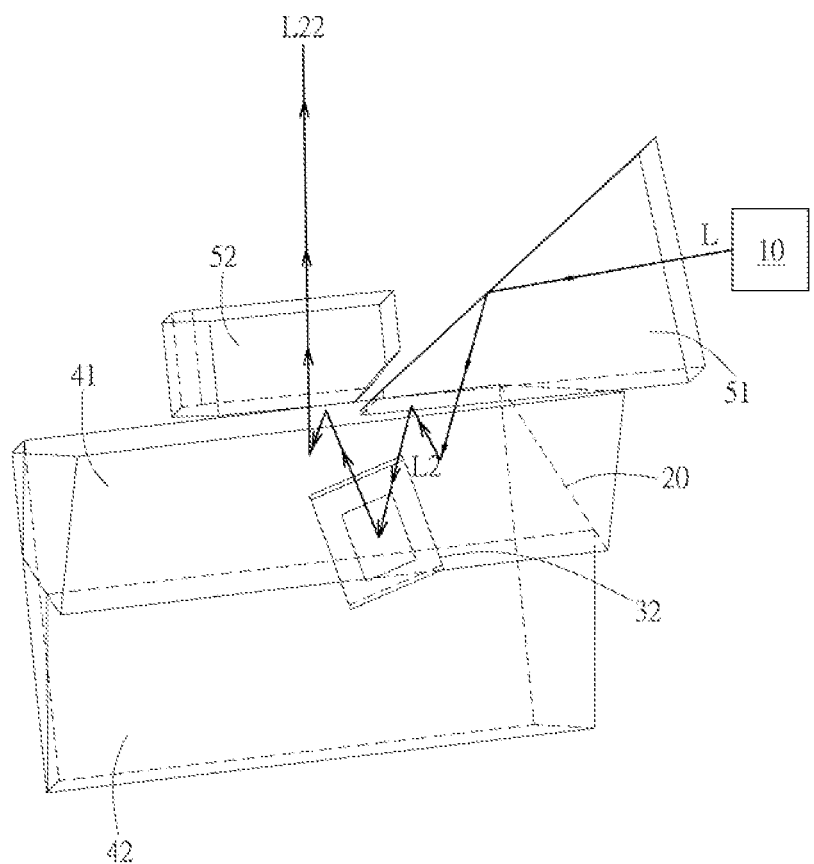

Referring to FIGS. 1B, 2A and 2B, the optical paths of the projection device are illustrated. As shown in FIGS. 1B and 2A, the illumination light L provided by the light source module 10 is incident to the first prism 41 via the optical element 51. When the illumination light L travels in the first prism 41 to the dichroic film 20 between the first prism 41 and the second prism 42, the first portion of the illumination light L transmits through the dichroic film 20 to form the light L1 in the first wavelength range. The light L1 in the first wavelength range transmits out of the second prism 42 and is reflected from the first DMD 31 into the first light L11, and the first light L11 is incident to the second prism 42, transmits through the dichroic film 20, and emits out of the first prism 41. The first light L11 is then directed by the optical element 52 to emit out of the projection device.

As shown in FIGS. 1B and 2B, when the illumination light L travels in the first prism 41 to the dichroic film 20 between the first prism 41 and the second prism 42, the second portion of the illumination light L is reflected from the dichroic film 20 into the light L2 in the second wavelength range. The light L2 in the second wavelength range transmits out of the first prism 41 and reflected from the second DMD 32 into the second light L22, and the second light L22 is incident to the first prism 41, reflected from the dichroic film 20, and emits out of the first prism 41. The second light L22 is then directed by the optical element 52 to emit out of the projection device to form the image light LI with the first light L11.

Specifically, when the illumination light L reaches the dichroic film 20 between the first prism 41 and the second prism 42, the light-filtering property of the dichroic film 20 (e.g., allowing the first light L1 in the first wavelength range to transmit therethrough and reflecting the second light L2 in the second wavelength range) enables lights in different wavelength ranges to reach its corresponding DMD (i.e., 31, 32) and then to be reflected from the corresponding DMD (i.e., 31, 32) and emitted out of the projection device to form the image light. As such, the projection device can achieve a non-sequentially light-filtering effect to effectively promote the color light output and improve the image quality.

Figure 3:
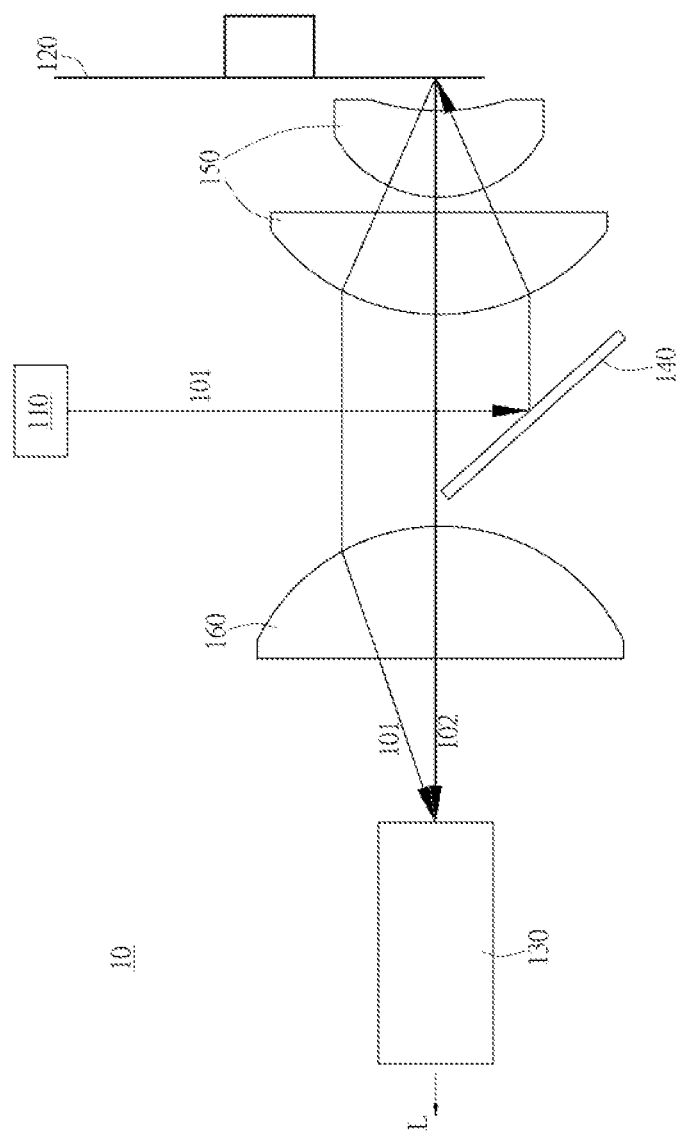
FIG. 3 is a schematic view of the light source module in an embodiment of the invention.

As mentioned above, the light source module may have different configurations to provide the desired illumination light L. In an embodiment, as shown in FIG. 3, the light source module 10 includes a light source 110, a wavelength conversion unit 120, and a light-combining element 130. The light source 110 is configured to provide a first color light 101. The wavelength conversion unit 120 is configured to convert a portion of the first color light 101 into a second color light 102. The first color light 101 and the second color light 102 fall in different wavelength ranges. The light-combining element 130 is configured to combine the second color light 102 and the first color light 101 that is not converted by the wavelength conversion unit 120 to form the illumination light L.

Specifically, the light source 110 is preferably a light-emitting element of high light-emitting efficiency and reduced volume, such as light-emitting diode (LED) or laser diode. Moreover, the color (or wavelength) of light emitted from the light source 110 can be modified according to the wavelength conversion unit 120, so that the illumination light L formed by combining the first color light 101 that is not converted by the wavelength conversion unit 120 and the generated second color light 102 can have a desired color. For example, when the illumination light L is a white light, the light source 110 is preferably a blue laser diode, so that first color light 101 is a blue light, and the generated second color light 102 is preferably a yellow light. In other words, the wavelength of the first color light 101 preferably falls within the wavelength range of 380~476 nm, and the wavelength of the second color light 102 preferably falls within the wavelength range of 550~590 nm, but not limited thereto.

Figure 3A:
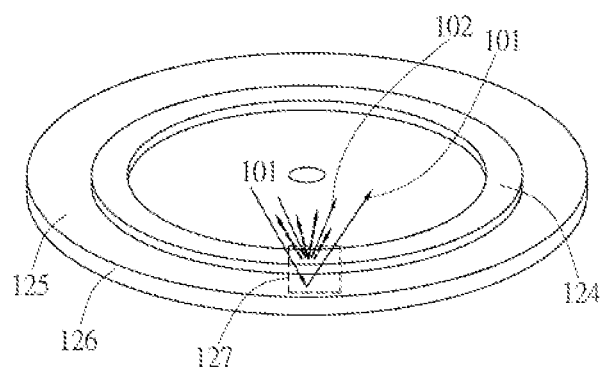
FIGS. 3A and 3B are schematic views of the wavelength conversion unit in different embodiments of the invention.

As shown in FIG. 3A, in an embodiment, the wavelength conversion unit 120 preferably includes a substrate 126 and a wavelength conversion layer 124. The substrate 126 has a reflective surface 125, which is configured to reflect the first color light 101. In an embodiment, the reflective surface 125 can be configured to also reflect the second color light 102. In this embodiment, the substrate 126 can be embodied as a metal plate, such as aluminum plate, and the reflective surface 125 is the outer surface of the substrate 126. In another embodiment, the substrate 126 can be made of reflective or non-reflective materials, and the reflective surface 125 is a reflective film adhered on the surface of the substrate 126 or a reflective layer coated on the surface of the substrate 126. The reflective surface 125 faces toward the outer side of the substrate 126. The wavelength conversion layer 124 is disposed on the substrate 126 adjacent to the reflective surface 125. In this embodiment, the wavelength conversion layer 124 is preferably disposed on a same side of the substrate 126 with the reflective surface 125, such as light incident side of the substrate 126, and the wavelength conversion layer 124 is neighboring the reflective surface 125. When the first color light 101 irradiates the wavelength conversion unit 120 from the light incident side, the first color light 101 is preferably incident on both of the reflective surface 125 and the wavelength conversion layer 124, as shown in the irradiation region 127. As such, the wavelength conversion layer 124 is excited by the first color light 101 to generate the second color light 102 toward a predetermined direction (e.g., toward the light-combining element 130). Specifically, the first color light 101 is incident on the reflective surface 125 and the wavelength conversion layer 124 at the same time, so that the first color light 125 incident on the reflective surface 125 is reflected therefrom toward the light-combing element 130, and the first color light 101 incident on the wavelength conversion layer 124 excites the wavelength conversion layer 124 to generate the second color light 102, which travels toward the light-combining element 130.

In another embodiment, the reflective surface 125 preferably extends between the wavelength conversion layer 124 and the substrate 126. For example, a portion of the reflective surface 125 has the wavelength conversion layer 124 disposed thereon, and another portion of the reflective surface 125 adjacent to the wavelength conversion layer 124 is exposed. As such, the second color light 102 generated by the wavelength conversion layer 124, which is excited by the first color light 101, toward the substrate 126 can be can be reflected in a predetermined direction, for example, toward the light-combining element 130 through the reflective surface 125 between the wavelength conversion layer 124 and the substrate 126, so as to increase the brightness of the second color light 102, but not limited thereto.

Figure 3B:
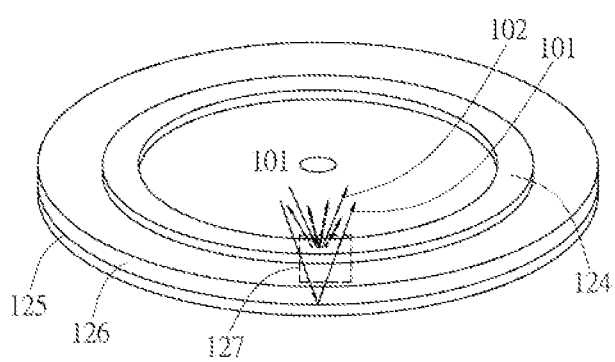

In another embodiment, as shown in FIG. 3B, the substrate 126 can be a transparent substrate, and the reflective surface 125 and the wavelength conversion layer 124 are disposed on two opposite sides of the substrate 126, such as light-exit side and light incident side. For example, the reflective surface 125 can be formed by attaching a reflective film on the light exit side of the substrate 126 and overlapping the wavelength conversion layer 124 with the substrate 126 interposed therebetween. In this embodiment, the reflective surface 125 faces toward the inner side of the substrate 126, and the area of the reflective surface 125 is larger than that of the wavelength conversion layer 124. When the first color light 101 irradiates the wavelength conversion unit 120 form the light incident side, the first color light 101 is preferably incident on the reflective surface 125 and the wavelength conversion layer 124 at the same time, as shown in the irradiation region 127, so that a portion of the first color light 101 transmits through the substrate 126 and is then reflected from the reflective surface 125 toward the light-combining element 130, and another portion of the first color light 101 incident on the wavelength conversion layer 124 excites the wavelength conversion layer 124 to generate the second color light 102 toward a predetermined direction (e.g., toward the light-combining element 130). A portion of the second color light 102, which travels toward the substrate 126, can be reflected from the reflective surface 125 disposed on the light exit side toward the predetermined direction (e.g., toward the light-combining element 130), to increase the brightness of the second color light 102.

In an embodiment, the wavelength conversion unit 120 can be a color wheel, and the wavelength conversion layer 124 is disposed on the substrate 126 in a closed ring configuration. The driving device (such as a motor) drives the substrate 126 to rotate, so as to drive the wavelength conversion layer 124 to change the region excited by the first color light 101, improving the conversion efficiency and extending the service life of the wavelength conversion unit 120. The wavelength conversion layer 124 can include materials, such as phosphor powders or quantum dots, which can directly or indirectly convert light energy when under excitation. According to the material of the wavelength conversion layer 124, the wavelength of light converted therefrom can be modified. For example, YAG (yttrium aluminium garnet) phosphor powders can generate light in a wavelength range of 550 nm to 560 nm. The wavelength conversion layer 124 can be modified according to, for example, the wavelength of the first color light 101, the wavelength of the generated second color light 102, the wavelength of the illumination light L. In an embodiment, when the illumination light L is a white light, the wavelength conversion layer 124 preferably includes yellow phosphor powders coated on the substrate 126, so that the first color light 101 (such as blue light) can excite the wavelength conversion layer 124 to generate the second color light 102, such as yellow light.

The light-combining element 130 is preferably disposed at the light exit end of the light source module 10 and configured to form the illumination light L by combining the first color light 101 and the second color light 102. For example, the light-combining element 130 can be a light pipe or a light rod. In this embodiment, the light source module 10 further includes a dichroic member 140, which is preferably disposed in the optical path between the light source 110 and the wavelength conversion unit 120. The dichroic member 140 is an optical element, which allows lights of a specific wavelength range to transmit therethrough and reflects lights of another specific wavelength range. For example, the dichroic member 140 can be a dichroic mirror or a color filter, which has an optical coating on the light incident region according to required optical properties. In this embodiment, the dichroic member 140 is preferably configured to reflect the first color light 101 and allow the second color light 102 to transmit therethrough. For a white illumination light L, the dichroic member 140 preferably reflects blue light and allows yellow light to transmit therethrough.

Moreover, according to practical requirements and designed optical paths, the light source module 10 can optionally include other optical elements (e.g., lens, reflector) to achieve a desired optical effect, such as guidance, convergence, reflection, refraction, so as to effectively configure the optical paths in a limited space. For example, as shown in FIG. 3, the light source module 10 may preferably include a set of lenses 150 and at least one lens 160. In this embodiment, the set of lenses 150 is preferably disposed in the optical path between the dichroic member 140 and the wavelength conversion unit 120, i.e., the downstream of the optical path with respect to the dichroic member 140 and the upstream of the optical path with respect to the wavelength conversion unit 120. As shown in FIG. 3, the set of lenses 140 includes for example two lenses, which focus and overlap the first color light 101 on the wavelength conversion unit 120, but not limited thereto. In another embodiment, the set of lenses 150 can include one or more lenses. The lens 160 is disposed at the upstream of the optical path with respect to the light-combining element 130 and configured to converge the first color light 101 and the second color light 102.

In this embodiment, the dichroic member 140 is preferably disposed off-axis with respect to the set of lenses 150, so that the central axis of the dichroic member 140 is located on one side with respect to the central axis of the set of lenses 150. In other words, the central axes of the dichroic member 140 and the set of lenses 150 do not overlap with each other along the extending direction of the central axis. With such a configuration, the portion of the first color light 101 that is reflected from the reflective surface 125 toward the set of lenses 150 will transmit through the set of lenses 150 and bypass the dichroic member 140 without interfering with the dichroic member 140, and then travels toward the light-combining element 130 to form the illumination light L with the second color light 102. For example, the dichroic member 140 is preferably disposed on the lower side with respect to the central axis of the set of lenses 150, so that the first color light 101 reflected from the reflective surface 125 will transmit through the upper portion of the set of lenses 150 and pass above the dichroic member 140 without entering the dichroic member 140 or being reflected from the dichroic member 140. As such, at least a portion of the first color light 101 that is reflected from the reflective surface 125 can be combined with the second color light 102 to form the illumination light L.

Referring to FIG. 3, the optical path of the light source module 10 for providing a white illumination light L will be described. As shown in FIG. 3, the first color light 101 (e.g., blue light) provided by the light source 110 is reflected from the dichroic member 140 to the set of lenses 150. The set of lenses 150 focuses the first color light 101 reflected from the dichroic member 140 on the wavelength conversion unit 120, so that the first color light 101 is incident on the reflective surface 125 and the wavelength conversion layer 124 at the same time. The portion of the first color light 101 incident on the reflective surface 125 is reflected from the reflective surface 125 and transmits through the set of lenses 150, and then bypass the dichroic member 140 from the upper side to form the first color light 101 not converted by the wavelength conversion unit 120 (i.e., non-converted first color light). At the same time, the wavelength conversion layer 124 is excited by the portion of the first color light 101 incident on the wavelength conversion layer 124 to generate the second color light 102 (e.g., yellow light) toward the set of lenses 150. The second color light 102 transmits through the set of lenses 150 and then transmits through or bypass the dichroic member 140 to enter the light-combining element 130, so as to form the illumination light L with the non-converted first color light 101. With such a configuration, the light source module 10 can provide a white illumination light L in a non-sequential manner.

Figure 4:
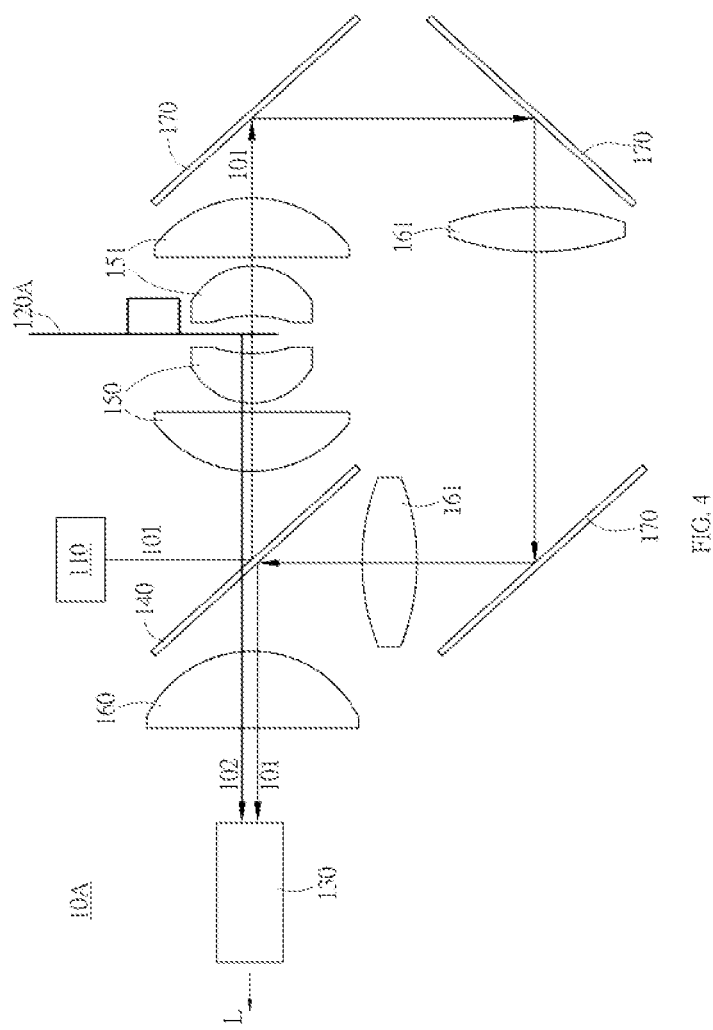
FIG. 4 is a schematic view of the light source module in another embodiment of the invention.

According to the space and the designed optical paths, the light source module can have different configurations to provide the first color light 101 and the second color light 102 that constitute the illumination light L. In another embodiment, as shown in FIG. 4, the light source module 10A includes a light source 110, a wavelength conversion unit 120A, and a light-combining element 130. The embodiment of FIG. 4 is different from the embodiment of FIG. 3 in that the wavelength conversion unit 120 is replaced with the wavelength conversion unit 120A. In this embodiment, the light source module 10A can further include a dichroic member 140, a plurality sets of lenses 150 and 151, a plurality of lenses 160 and 161, and one or more reflective mirrors 170. Hereinafter, the difference between embodiments of FIG. 4 and FIG. 3 will be described, and the details of other elements (e.g., the light source 110, the dichroic member 140, the set of lenses 150, the lens 160, the light-combining element 130) can be referred to the related descriptions of the previous embodiment and will not elaborate again.

Figure 4A:
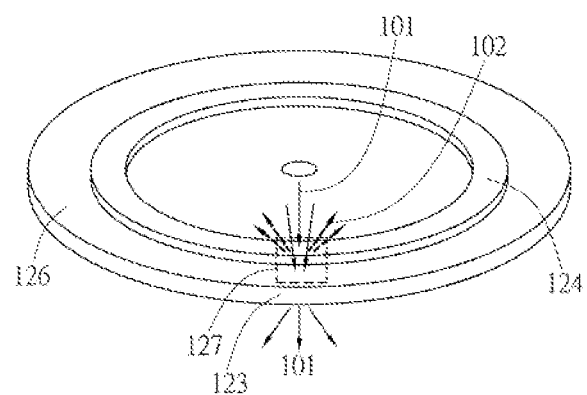
FIG. 4A is a schematic view of the wavelength conversion unit in another embodiment of the invention.

As shown in FIG. 4A, in an embodiment, the wavelength conversion unit 120A includes a substrate 126 and a wavelength conversion layer 124. The substrate 126 has a light transparent portion 123, which allows the first color light 101 to transmit therethrough. The wavelength conversion layer 124 is disposed on the substrate 126 adjacent to the light transparent portion 123. The first color light 101 is incident on the wavelength conversion layer 124, so that the second color light 102 is generated by the wavelength conversion layer 124 which is excited by the first color light 101. In other words, the wavelength conversion layer 124 is preferably disposed on the light incident side of the substrate 126. In an embodiment, the substrate 126 can be embodied as a light transparent substrate, such as glass substrate or polymer substrate, i.e., the entire substrate 126 can be the light transparent portion 123. In another embodiment (not shown), the substrate 126 can be a non-transparent substrate having the light transparent portion 123 (such as opening or light transparent component), so that the first color light 101 can only transmit through the light transparent portion 123. The wavelength conversion layer 124 is disposed on the substrate 126 corresponding to the light transparent portion 123, so that the first color light 101 can be incident on the wavelength conversion layer 124 and the adjacent light transparent portion 123 at the same time. With such a configuration, the wavelength conversion layer 124 can be excited by the portion of the first color light 101 incident on the wavelength conversion layer 124 to generate the second color light 102, and another portion of the first color light 101 incident on the light transparent portion 123 can transmit through the light transparent portion 123 without being converted. Moreover, a reflective surface (not shown) can be optionally disposed between the wavelength conversion layer 124 and the substrate 126, so that the second color light 102 generated toward the substrate 126 can be reflected from the reflective surface to travel toward a predetermined direction, such as toward the light-combining element 130, to increase the brightness of the second color light 102.

The set of lenses 151 is preferably disposed at the downstream of the optical path with respect to the wavelength conversion unit 120A and configured to converge the first color light 101 that transmits through the light transparent portion 123. The set of lenses 151 includes one or more lenses. In this embodiment, two lenses 161 and three reflective mirrors 170 are disposed in the optical path between the downstream of the wavelength conversion unit 120A and the dichroic member 140 and configured to direct the converged first color light 101 to the dichroic member 140, at which the converged first color light 101 is reflected to the light-combining element 130, but not limited thereto. According to practical requirements and the optical path design, the number of lenses 161 and reflective mirrors 170 cam be modified to direct the first color light 101 to the light-combining element 130 after transmitting through the light transparent portion 123.

Referring to FIG. 4, the optical path of the light source module 10A for providing a white illumination light L will be described. As shown in FIG. 4, the first color light 101 (e.g., blue light) provided by the light source 110 is reflected from the dichroic member 140 to the set of lenses 150. The set of lenses 150 focuses the first color light 101 reflected from the dichroic member 140 on the wavelength conversion unit 120A, so that the first color light 101 is incident on the wavelength conversion layer 124 and the light transparent portion 123 at the same time, wherein the first color light 101 is partially converted and partially transmits therethrough. Specifically, the portion of the first color light 101 transmitting through the light transparent portion 123 (i.e., non-converted first color light) is converged by the set of lenses 151, travels to another side of the dichroic member 140 with respect to the light source 110 through reflections by the reflective mirrors 170 and convergences by the set of lenses 151, and then is reflected from the dichroic member 140 to travel toward the light-combining element 130 through the lens 160. The wavelength conversion layer 124 is excited by the portion of the first color light 101 incident thereon to generate the second color light 102 (e.g., yellow light) toward the set of lenses 150. The second color light 102 transmits through the set of lenses 150 and then through the dichroic member 140 to enter the light-combining element 130 through the lens 160, so as to form the illumination light L with the non-converted first color light 101. With such a configuration, the light source module 10A can provide a white illumination light L in a non-sequential manner.

Figure 5:
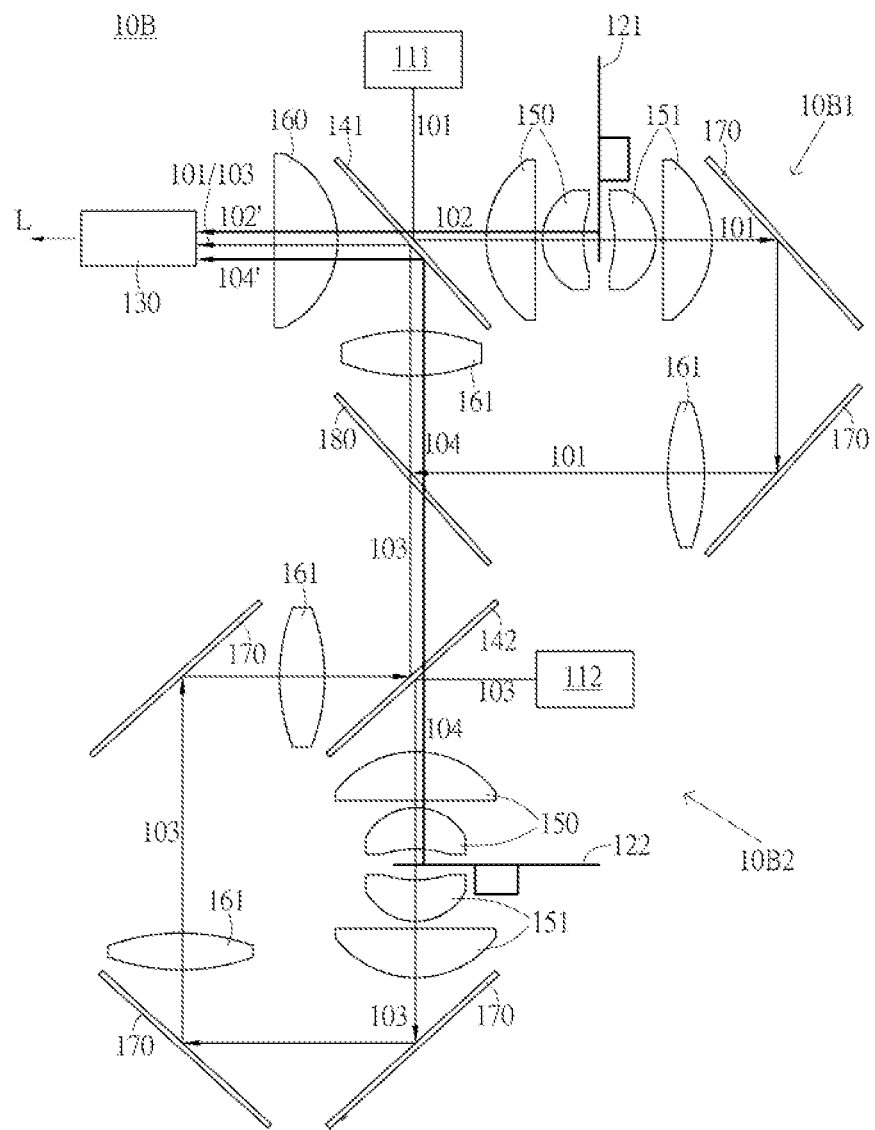
FIGS. 5 to 8 are schematic views of the light source module in other embodiments of the invention.

In the light source modules 10 and 10A, one light source 110 is illustrated, but not limited thereto. In other embodiments, multiple light sources can be utilized to increase the brightness. For example, the light source module 10 of FIG. 3 or the light source module 10A of FIG. 4 can function as a sub-light source module. By integrating multiple light source modules 10, multiple light source modules 10A ora combination of light source modules 10 and 10A, a light source module with multiple light sources can be constituted to further increase the brightness. As shown in FIG. 5, in another embodiment, the light source module 10B includes a first light source 111, a first wavelength conversion unit 121, a second light source 112, a second wavelength conversion unit 122, and a light-combining element 130. The first light source 111 is configured to provide a first color light 101. The first wavelength conversion unit 121 is configured to convert a portion of the first color light 101 into a second color light 102, wherein the first color light 101 and the second color light 102 fall in different wavelength ranges. The second light source 112 is configured to provide a third color light 103. The second wavelength conversion unit 122 is configured to convert a portion of the third color light 103 into a fourth color light 104, wherein the third color light 103 and the fourth color light 104 fall in different wavelength ranges. The light-combining element 130 is configured to combine the first color light 101 not converted by the first wavelength conversion unit 121, at least a portion of the second color light 102, the third color light 103 not converted by the second wavelength conversion unit 122, and at least a portion of the fourth color light 104 to form the illumination light L.

The light source module 10B can further include a first dichroic member 141 and a second dichroic member 142. The first dichroic member 141 is configured to reflect the first color light 101 and allow the second color light 102 and the fourth color light 104 to partially transmit therethrough. The second dichroic member 142 is configured to reflect the third color light 103 and allow the fourth color light 104 to transmit therethrough. The first color light 101 is reflected from the first dichroic member 141 to the first wavelength conversion unit 121 to generate the second color light 102. The second color light 102 transmits through the first dichroic member 141 to travel toward the light-combining element 130. The first color light 101 not converted by the first wavelength conversion unit 141 transmits through the first wavelength conversion unit 141 to travel toward the light combining element 130. The third color light 103 is reflected from the second dichroic member 142 to the second wavelength conversion unit 122 to generate the fourth color light 104. The fourth color light 104 transmits through the second dichroic member 142 to travel toward the light-combining element 130. The third color light 103 not converted by the second wavelength conversion unit 122 transmits through the second wavelength conversion unit 122 to be reflected by the second dichroic member 142 and the first dichroic member 141 to the light-combining element 130.

Specifically, the light source module 10B can be considered as an integration of two light source modules 10A of FIG. 4. For example, the first light source 111, the first wavelength conversion unit 121, and the first dichroic member 141 are configured similar to the light source module 10A of FIG. 4 to form a first sub-light source module 10B1. The second light source 112, the second wavelength conversion unit 122, and the second dichroic member 142 are also configured similar to the light source module 10A of FIG. 4 to form a second sub-light source module 10B2. The first sub-light source module 10131 and the second sub-light source module 10B2 are integrated with one light-combining element 130 to form the light source module 10B. The first sub-light source module 1061 and the second sub-light source module 10B2 each can further include one or more sets of lenses (e.g., 150, 151), lenses (e.g., 160, 161), and reflective mirrors 170. The details of elements of the first sub-light source module 10B1 and the second sub-light source module 10B2 can be referred to related descriptions of FIG. 4 and will not elaborate again. For example, the first wavelength conversion unit 121 and the second wavelength conversion unit 122 can have same or similar configuration and function as the wavelength conversion unit 120A. Hereinafter, the difference of the embodiment of FIG. 5 from the previous embodiments will be described.

In this embodiment, the first light source 111 and the second light source 112 are preferably light-emitting elements, which emit lights of same color but different polarities. In other words, the first color light 101 provided by the first light source 111 and the third color light 103 provide by the second light source 112 preferably fall in a same wavelength range with different polarities. For a white illumination light L, the first light source 111 and the second light source 112 are preferably blue laser diodes, so that the blue light emitted from the first light source 111 has a first polarity (such as S polarity), and the blue light emitted from the second light source 112 has a second polarity (such as P polarity), which is different from the first polarity. Moreover, the light source module 10B can further include a polarity dichroic member 180, which is configured to reflect lights having the first polarity and allow lights having the second polarity to transmit therethrough. For example, the polarity dichroic member 180 is preferably configured to reflect lights having S polarity and allows lights having P polarity to transmit therethrough, but not limited thereto. According to practical applications and the optical path design, the polarity dichroic member 180 can be configured to reflect lights having P polarity and allows lights having S polarity to transmit therethrough. In this embodiment, the polarity dichroic member 180 is preferably disposed in the optical path between the first sub-light source module 10B1 and the second sub-light source module 10B2 to serve as a common optical element of the first and second sub-light source modules 10B1 and 10B2. The dichroic member 141 is configured to reflect the first color light 101 and allow the second color light 102 and the fourth color light 104 to partially transmit therethrough, i.e., reflect a portion of the second color light 102 and the fourth color light 104. The portion of the second color light 102 that transmits through the first dichroic member 141 is the second color light 102', and the portion of the fourth color light 104 that is reflected by the first dichroic member 141 is the fourth color light 104'. In an embodiment, the first dichroic member 141 can be configured to reflect blue light and red light and allow green light to transmit therethrough. In another embodiment, the first dichroic member 141 can be configured to reflect blue light and green light and allow red light to transmit therethrough.

Referring to FIG. 5, the optical path of the light source module 10B for providing a white illumination light L will be described. As shown in FIG. 5, for the first sub-light source module 10B1, the first color light 101 (e.g., blue light with S polarity) provided by the first light source 111 is reflected from the first dichroic member 141 to the set of lenses 150. The set of lenses 150 focuses the first color light 101 reflected from the first dichroic member 141 on the first wavelength conversion unit 121. A portion of the first color light 101 transmits through the light transparent portion 123 of the substrate 126 and is then converged by the set of lenses 151. The converged first color light 101 travels to the polarity dichroic member 180 through reflections by the reflective mirrors and convergence by the lens 161, and is then reflected from the polarity dichroic member 180 to another side of the first dichroic member 141 with respect to the first light source 111, and is then reflected from the first dichroic member 141 to travel toward the light-combining element 130 through the lens 160. At the same time, another portion of the first color light 101 is incident on the wavelength conversion layer 124 of the first wavelength conversion unit 121, so that the wavelength conversion layer 124 is excited by the portion of the first color light 101 incident thereon to generate the second color light 102 (e.g., yellow light) toward the set of lenses 150. The second color light 102 transmits through the set of lenses 150 and then partially transmits through the first dichroic member 141 to form the second color light 102', which enters the light-combining element 130 through the lens 160. For example, when the first dichroic member 141 is configured to reflect blue light and red light and allow green light to transmit therethrough, the green light (i.e., 102') in the second color light 102 can transmit through the first dichroic member 141 and enter the light-combining element 130.

For the second sub-light source module 1062, the third color light 103 (e.g., blue light with P polarity) provided by the second light source 112 is reflected from the second dichroic member 142 to the set of lenses 150. The set of lenses 150 focuses the third color light 103 reflected from the second dichroic member 142 on the second wavelength conversion unit 122. A portion of the third color light 103 transmits through the light transparent portion 123 of the substrate 126 and is then converged by the set of lenses 151. The converged third color light 103 travels to another side of the second dichroic member 142 with respect to the second light source 112 through reflections by the reflective mirrors 170 and convergence by the lens 161, and is then reflected from the second dichroic member 142 to the polarity dichroic member 180. Since polarity dichroic member 180 is configured to allow lights having the second polarity (e.g., P polarity) to transmit therethrough, the third color light 103 can transmit through the polarity dichroic member 180 to travel to another side of the first dichroic member 141 with respect to the light source 111, and is then reflected from the first dichroic member 141 to travel toward the light-combining element 130 through the lens 160. At the same time, another portion of the third color light 103 is incident on the wavelength conversion layer 124 of the second wavelength conversion unit 122, so that the wavelength conversion layer 124 is excited by the portion of the third color light 103 incident thereon to generate the fourth color light 104 (e.g., yellow light) toward the set of lenses 150. The fourth color light 104 transmits through the set of lenses 150, the second dichroic member 142, and the polarity dichroic member 180 to travel to another side of the first dichroic member 141 with respect to the first light source 111. In this embodiment, since the first dichroic member 141 is configured to reflect blue light and red light and allow green light to transmit therethrough, the green light in the fourth color light 104 will transmit through the first dichroic member 141, i.e., the green light is filtered out, and the red light (i.e., 104') is reflected from the first dichroic member 141 to the light-combining element 130. The light-combining element 130 combine the first color light 101 (i.e., blue light with S polarity) lastly reflected from the first dichroic member 141, the second color light 102' (i.e., green light) which is the portion of the second color light 102 transmits through the first dichroic member 141, the third color light 103 (i.e., blue light with P polarity) lastly reflected from the first dichroic member 141, and the fourth color light 104' (i.e., red light) which is the portion of the fourth color light 104 reflected from the first dichroic member 141. With such a configuration, the light source module 10B can provide a white illumination light L in a non-sequential manner.

Figure 6:
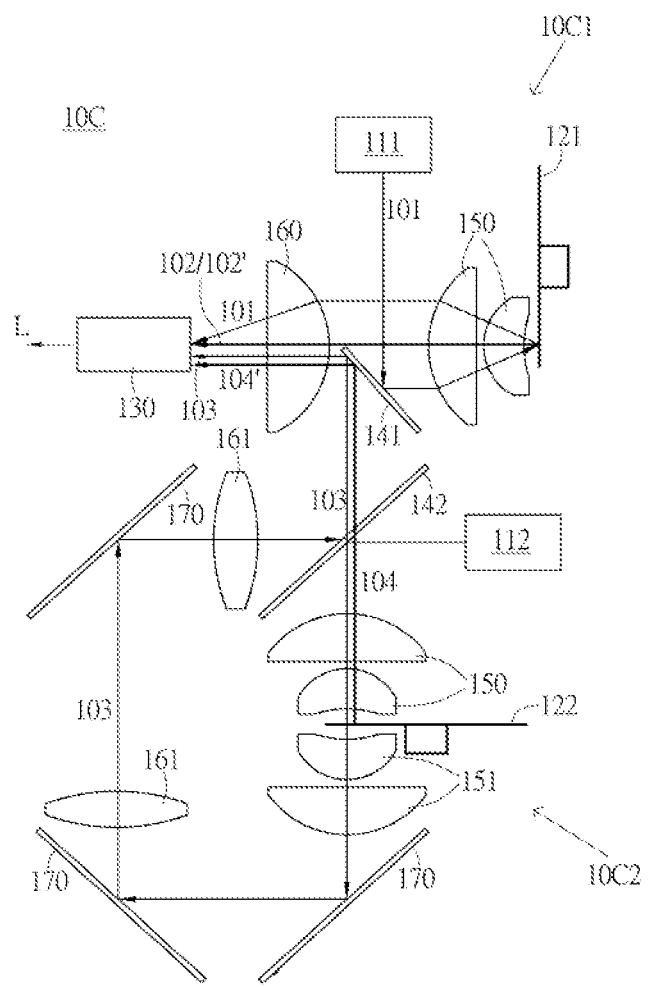

As shown in FIG. 6, in another embodiment, the light source module 10C can be considered as an integration of one light source module 10 of FIG. 3 and one light source module 10A of FIG. 4. For example, the first light source 111, the first wavelength conversion unit 121, and the first dichroic member 141 are configured similar to the light source module 10 of FIG. 3 to form a first sub-light source module 10C1. The second light source 112, the second wavelength conversion unit 122, and the second dichroic member 142 are configured similar to the light source module 10A of FIG. 4 to form a second sub-light source module 10C2. The details of elements of first sub-light source module 10C1 and the second sub-light source module 10C2 can be referred to related descriptions of previous embodiments of FIGS. 3-5 and will not elaborate again. For example, the first wavelength conversion unit 121 can have same or similar configuration and function as the wavelength conversion unit 120 of FIG. 3, and the second wavelength conversion unit 122 can have same or similar configuration and function as the wavelength conversion unit 120A of FIG. 4. Hereinafter, the difference of the embodiment of FIG. 6 from the previous embodiments will be described.

In this embodiment, the first color light 101 provided by the first light source 111 is reflected from the first dichroic member 141 to the first wavelength conversion unit 121 to generate the second color light 102. The second color light 102 transmits through the first dichroic member 141 to travel toward the light-combining element 130. The first color light 101 not converted by the first wavelength conversion unit 121 is reflected from the first wavelength conversion unit 121 to bypass the first dichroic member 141 toward the light-combining element 130. Moreover, since the non-converted first color light 101 in the first sub-light source module 10C1 is reflected from the first wavelength conversion unit 121, instead of transmitting therethrough, no polarity dichroic member 180 is disposed between the first and second sub-light source modules 10C1 and 10C2. In other words, the first color light 101 provided by the first light source 111 and the third color light 103 provided by the second light source 112 preferably fall in a same wavelength range (e.g., blue light) and have same or different polarity.

Referring to FIG. 6, the optical path of the light source module 100 for providing a white illumination light L will be described. As shown in FIG. 6, for the first sub-light source module 10C1, the first color light 101 (e.g., blue light) provided by the first light source 111 is reflected from the first dichroic member 141 to the set of lenses 150. The set of lenses 150 focuses the first color light 101 reflected from the first dichroic member 141 on the first wavelength conversion unit 121, so that the first color light 101 is incident on the reflective surface 125 and the wavelength conversion layer 124 at the same time. The portion of the first color light 101 incident on the reflective surface 125 is reflected from the reflective surface 125 and transmits through the set of lenses 150, and then bypasses the first dichroic member 140 from the upper side to form the first color light 101 not converted by the first wavelength conversion unit 121 (i.e., non-converted first color light). At the same time, the wavelength conversion layer 124 is excited by the portion of the first color light 101 incident on the wavelength conversion layer 124 to generate the second color light 102 (e.g., yellow light) toward the set of lenses 150. The second color light 102 transmits through the set of lenses 150 and then partially transmits through the first dichroic member 141 to form the second color light 102', which travels to the light-combining element 130 through the lens 160. For example, when the first dichroic member 141 is configured to reflect blue and red light and allow green light to transmit therethrough, the green light (i.e., 102') in the second color light 102 can transmit through the first dichroic member 141 and enter the light-combining element 130.

For the second sub-light source module 10C2, the third light 103 (e.g., blue light) provided by the second light source 112 is reflected from the second dichroic member 142 to the set of lenses 150. The set of lenses 150 focuses the third color light 103 reflected from the second dichroic member 142 on the second wavelength conversion unit 122. A portion of the third color light 103 transmits through the light transparent portion 123, is converged by the set of lenses 151, travels to another side of the second dichroic member 142 with respect to the second light source 112 through reflections by the reflective mirrors 170 and convergences by the lens 161, and then is reflected from the second dichroic member 142 to travel toward another side of the first dichroic member 141 with respect to the first light source 111 and be reflected from the first dichroic member 141 to the light-combining element 130 through the lens 160. Another portion of the third color light 103 is incident on the wavelength conversion layer 124 of the second wavelength conversion unit 122, so that the wavelength conversion layer 124 is excited by the third color light 103 incident thereon to generate the fourth color light 104 (e.g., yellow light) toward the set of lenses 150. The fourth color light 104 transmits through the set of lenses 150 and the second dichroic member 142 to another side of the first dichroic member 141 with respect to the first light source 111. In this embodiment, since the first dichroic member 141 is configured to reflect blue light and red light and allow green light to transmit therethrough, the green light of the fourth color light 104 will transmit through the first dichroic member 141 (i.e., is filtered out), and the red light (i.e., the fourth color light 104') is reflected from the first dichroic member 141 to the light-combining element 130. The light-combining element 130 combines the first color light 101 (i.e., blue light) lastly reflected from the first dichroic member 141, the second color light 102' (i.e., green light) which is the portion of the second color light 102 transmits through the first dichroic member 141, the third color light 103 (i.e., blue light) lastly reflected from the first dichroic member 141, and the fourth color light 104' (i.e., red light) which is the portion of the fourth color light 104 reflected from the first dichroic member 141. With such a configuration, the light source module 10C can provide a white illumination light L in a non-sequential manner.

Figure 7:
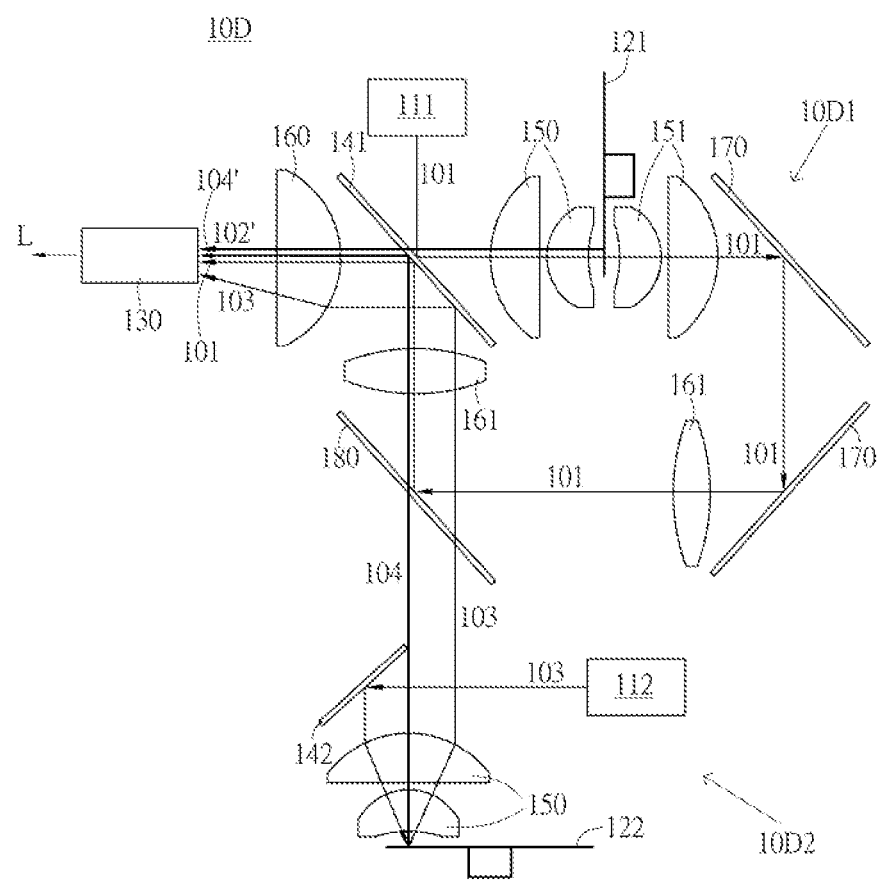

As shown in FIG. 7, in another embodiment, the light source module 10D can be considered as an integration of one light source module 10 of FIG. 3 and one light source module 10A of FIG. 4. For example, the first light source 111, the first wavelength conversion unit 121, and the first dichroic member 141 are configured similar to the light source module 10A of FIG. 4 to form a first sub-light source module 10D1. The second light source 112, the second wavelength conversion unit 122, and the second dichroic member 142 are configured similar to the light source module 10 of FIG. 3 to form a second sub-light source module 10D2. The details of elements of first sub-light source module 10D1 and the second sub-light source module 10D2 can be referred to related descriptions of previous embodiments of FIGS. 3-6 and will not elaborate again. For example, the first wavelength conversion unit 121 can have same or similar configuration and function as the wavelength conversion unit 120A of FIG. 4, and the second wavelength conversion unit 122 can have same or similar configuration and function as the wavelength conversion unit 120 of FIG. 3. Hereinafter, the difference of the embodiment of FIG. 7 from the previous embodiments will be described.

In this embodiment, the first light source 111 and the second light source 112 are preferably light-emitting elements, which emit lights of same color but different polarities. In other words, the first color light 101 provided by the first light source 111 and the third color light 103 provided by the second light source 112 fall in a same wavelength range with different polarities. For a white illumination light L, the first light source 111 and the second light source 112 are preferably blue laser diodes, so that the blue light emitted from the first light source 111 has a first polarity (such as S polarity), and the blue light emitted from the second light source 112 has a second polarity (such as P polarity), which is different from the first polarity. Moreover, the light source module 10D can further include a polarity dichroic member 180, which is configured to reflect lights having the first polarity and allow lights having the second polarity to transmit therethrough. The polarity dichroic member 180 is preferably disposed in the optical path between the first sub-light source module 10D1 and the second sub-light source module 10D2 to serve as a common optical element of the first and second sub-light source modules 10D1 and 10D2.

Referring to FIG. 7, the optical path of the light source module 10D for providing a white illumination light L will be described. As shown in FIG. 7, for the first sub-light source module 10D1, the optical path is similar to that of the first sub-light source module 10B1. For example, the first color light 101 (e.g., blue light with S polarity) provided by the first light source 111 is reflected from the first dichroic member 141 and focused by the set of lenses 150 to be simultaneously incident on the wavelength conversion layer 124 and the light transparent portion 123 of the first wavelength conversion unit 121. The portion of the first color light 101 transmitting through the light transparent portion 123 of the substrate 126 is converged by the set of lenses 151, reflected by the reflective mirrors 170, converged by the lens 161, and then travels to the polarity dichroic member 180, by which is reflected to the first dichroic member 141, by which is then reflected to travel toward the light-combining element 130. At the same time, another portion of the first color light 101 incident on the wavelength conversion layer 124 of the first wavelength conversion unit 121 excites the wavelength conversion layer 124 to generate the second color light 102 (e.g., yellow light). The second color light 102 transmits through the set of lenses 150 and then partially transmits through the first dichroic member 141 to form the second color light 102', which enters the light-combining element 130 through the lens 160. For example, when the first dichroic member 141 is configured to reflect blue light and green light and allow red light to transmit therethrough, the red light (i.e., 102') in the second color light 102 can transmit through the first dichroic member 141 and enter the light-combining element 130.

For the second sub-light source module 10D2, the third light 103 (e.g., blue light with P polarity) provided by the second light source 112 is reflected from the second dichroic member 142 to the set of lenses 150. The set of lenses 150 focuses the third color light 103 reflected from the second dichroic member 142 on the second wavelength conversion unit 122, so that the third color light 103 is incident on the reflective surface 125 and the wavelength conversion layer 124 at the same time. The portion of the third color light 103 incident on the reflective surface 125 is reflected therefrom to transmit through the set of lenses 150, bypasses the second dichroic member 142 from the upper side (or right side) to form the third color light 103 not converted by the second wavelength conversion unit 122 (i.e., non-converted third color light). The non-converted third color light 103 travels to the polarity dichroic member 180, which allows lights having the second polarity (e.g., P polarity) to transmit therethrough, and transmits through the polarity dichroic member 180 to another side of the first dichroic member 141 with respect to the first light source 111, and is then reflected from the first dichroic member 141 to enter the light-combining element 130 through the lens 160. At the same time, the wavelength conversion layer 124 of the second wavelength conversion unit 122 is excited by the portion of the third color light 103 incident thereon to generate the fourth color light 104 (e.g., yellow light). The fourth color light 104 transmits through the set of lenses 150 and transmits through or bypasses the second dichroic member 142 to the polarity dichroic member 180. The fourth color light 104 transmits therethrough the polarity dichroic member 180 to travel to another side of the first dichroic member with respect to the first light source 111. In this embodiment, since the first dichroic member 141 is configured to reflect blue light and green light and allow red light to transmit therethrough, the red light of the fourth color light 104 will transmit through the first dichroic member 141 (i.e., is filtered out), and the green light (i.e., the fourth color light 104') is reflected from the first dichroic member 141 to the light-combining element 130. The light-combining element 130 combines the first color light 101 (i.e., blue light with S polarity) lastly reflected from the first dichroic member 141, the second color light 102' (i.e., red light) which is the portion of the second color light 102 transmitting through the first dichroic member 141, the third color light 103 (i.e., blue light with P polarity) lastly reflected from the first dichroic member 141, and the fourth color light 104' (i.e., green light) which is the portion of the fourth color light 104 reflected from the first dichroic member 141. With such a configuration, the light source module 10D can provide a white illumination light L in a non-sequential manner.

Figure 8:
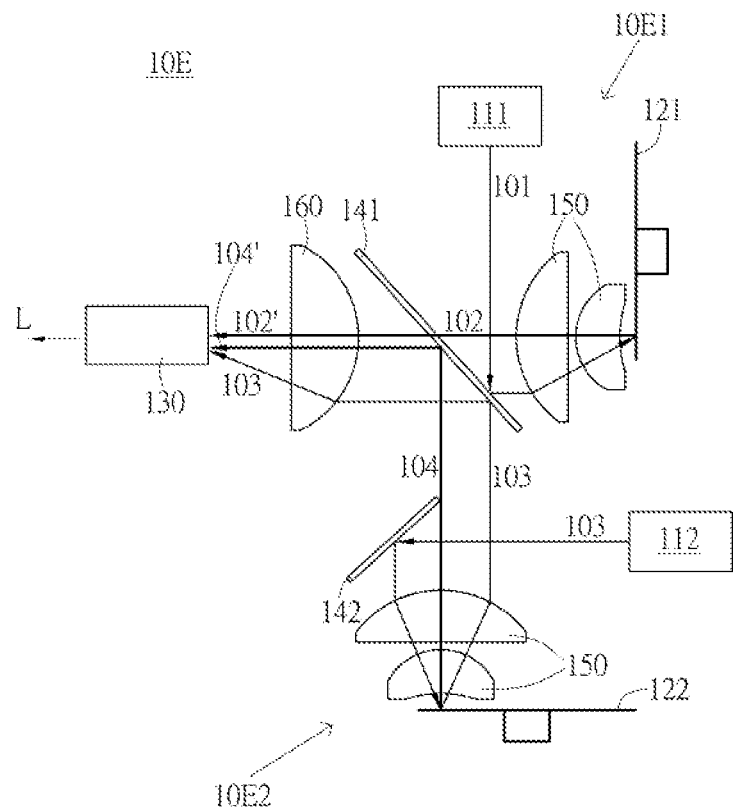

As shown in FIG. 8, in another embodiment, the light source module 10E can be considered as an integration of two light source modules similar to FIG. 3. For example, the first light source 111, the first wavelength conversion unit 121, and the first dichroic member 141 are configured similar to the light source module 10 of FIG. 3 to form a first sub-light source module 10E1. The second light source 112, the second wavelength conversion unit 122, and the second dichroic member 142 are also configured similar to the light source module 10 of FIG. 3 to form a second sub-light source module 10E2. The details of elements of first sub-light source module 10E1 and the second sub-light source module 10E2 can be referred to related descriptions of previous embodiments of FIGS. 3-7 and not elaborate again. For example, the second wavelength conversion unit 122 can have same or similar configurations and function as the wavelength conversion unit 120 of FIG. 3. Hereinafter, the difference of the embodiment of FIG. 8 from the previous embodiments will be described.

In this embodiment, the first wavelength conversion unit 121 can have a configuration similar to the wavelength conversion unit 120 of FIG. 3 or 120A of FIG. 4. Alternatively, the first wavelength conversion unit 121 may not have the reflective surface 125 of FIG. 3 or the transparent portion 123 of FIG. 4. In other words, the first wavelength conversion unit 121 can be a structure including the wavelength conversion layer 124 on the substrate 126. In this embodiment, the first wavelength conversion unit 121 is configured to convert the first color light 101 into the second color light 102. For example, when the first color light 101 is incident on the first wavelength conversion unit 121, the first color light 101 can only irradiate the wavelength conversion layer 124 without irradiating the reflective surface 125 or the light transparent portion 123, so that the first color light 101 is converted into the second color light 102 by the wavelength conversion layer 124 to improve the conversion efficiency and increase the brightness of the second color light 102.

Referring to FIG. 8, the optical path of the light source module 10E for providing a white illumination light L will be described. As shown in FIG. 8, for the first sub-light source module 10E1, the first color light 101 provided by the first light source 111 (e.g., blue light) is reflected from the first dichroic member 141 to the set of lenses 150. The set of lenses 150 focuses the first color light 101 reflected from the first dichroic member 141 on the first wavelength conversion unit 121, so that the first color light 101 is incident on the wavelength conversion layer 124. The wavelength conversion layer 124 is excited by the first color light 101 to generate the second color light 102 (e.g., yellow light). The second color light 102 transmits through the set of lenses 150 and then partially transmits through the first dichroic member 141 to form the second color light 102', which travels to the light-combining element 130 through the lens 160. For example, when the first dichroic member 141 is configured to reflect blue and green light and allow red light to transmit therethrough, the red light (i.e., 102') in the second color light 102 can transmit through the first dichroic member 141 and enter the light-combining element 130. That is, in this embodiment, the first sub-light source module 10E1 provides the second color light 102' (e.g., red light) to the light-combining element 130.

For the second sub-light source module 10E2, the optical path of the second sub-light source module 10E2 is similar to that of the second sub-light source module 10D2 of FIG. 7. For example, the third light 103 (e.g., blue light) provided by the second light source 112 is reflected from the second dichroic member 142 to the set of lenses 150. The set of lenses 150 focuses the third color light 103 reflected from the second dichroic member 142 on the second wavelength conversion unit 122, so that the third color light 103 is incident on the reflective surface 125 and the wavelength conversion layer 124 at the same time. The portion of the third color light 103 incident on the reflective surface 125 is reflected therefrom to transmit through the set of lenses 150, bypasses the second dichroic member 142 from the upper side (or right side) to form the third color light 103 not converted by the second wavelength conversion unit 122 (i.e., non-converted third color light). The non-converted third color light 103 travels to another side of the first dichroic member 141 with respect to the first light source 111, and is then reflected from the first dichroic member 141 to enter the light-combining element 130 through the lens 160. At the same time, the wavelength conversion layer 124 of the second wavelength conversion unit 122 is excited by the portion of the third color light 103 incident thereon to generate the fourth color light 104 (e.g., yellow light). The fourth color light 104 transmits through the set of lenses 150 and transmits through or bypasses the second dichroic member 142 to another side of the first dichroic member 141 with respect to the first light source 111. In this embodiment, since the first dichroic member 141 is configured to reflect blue light and green light and allow red light to transmit therethrough, the red light in the fourth color light 104 will transmit through the first dichroic member 141 (i.e., is filtered out), and the green light (i.e., the fourth color light 104') is reflected from the first dichroic member 141 to the light-combining element 130. The light-combining element 130 combines the second color light 102' (i.e., red light) which is the portion of the second color light 102 transmits through the first dichroic member 141, the third color light 103 (i.e., blue light) lastly reflected from the first dichroic member 141, and the fourth color light 104' (i.e., green light) which is the portion of the fourth color light 104 reflected from the first dichroic member 141. With such a configuration, the light source module 10D can provide a white illumination light L in a non-sequential manner.

In the embodiment of FIG. 8, no non-converted first color light 101 is provided to the light-emitting element 130 in the first sub-light source module 10E1. In other embodiments, by irradiating the first color light 101 on the wavelength conversion layer 124 and the reflective surface 125 of the first wavelength conversion unit 122, an optical path similar to that of the first sub-light source module 10C1 of FIG. 6 can be constructed to provide the non-converted first color light 101 and the generated second color light 102'.

Although the preferred embodiments of the present invention have been described herein, the above description is merely illustrative. The preferred embodiments disclosed will not limit the scope of the present invention. The terms "first" and "second" mentioned in this specification or the claims are merely used to distinguish or name individual components, not to limit the upper or lower limit of the number of elements. Further modification of the invention herein disclosed will occur to those skilled in the respective arts and all such modifications are deemed to be within the scope of the invention as defined by the appended claims.

What is claimed is:

1. A projection device for providing an image light, comprising:
    a light source module configured to provide an illumination light;
    a dichroic film configured to allow a first portion of the illumination light to transmit therethrough to form a light in a first wavelength range and to reflect a second portion of the illumination light into a light in a second wavelength range different from the first wavelength range;
    a first digital micromirror device (DMD) configured to reflect the light in the first wavelength range from the dichroic film into a first light; and
    a second DMD configured to reflect the light in the second wavelength range from the dichroic film into a second light,
    wherein the first light and the second light together form the image light,
    wherein the light source module comprises:
        a first light source configured to provide a first color light;

a first wavelength conversion unit configured to convert a portion of the first color light into a second color light, the first color light and the second color light falling in different wavelength ranges;

a second light source configured to provide a third color light;

a second wavelength conversion unit configured to convert a portion of the third color light into a fourth color light, the third color light and the fourth color light falling in different wavelength ranges; and a light-combining element configured to combine the first color light not converted by the first wavelength conversion unit, the second color light, the third color light not converted by the second wavelength conversion unit, and the fourth color light to form the illumination light.

2. The projection device of claim 1, further comprising a first prism and a second prism, wherein the dichroic film is disposed between the first prism and the second film, and the illumination light is incident to the first prism, wherein:

the first portion of the illumination light transmits through the dichroic film to form the light in the first wavelength range, the light in the first wavelength range transmits out of the second prism and is reflected from the first DMD into the first light, and the first light is incident to the second prism, transmits through the dichroic film, and emits out of the first prism; and the second portion of the illumination light is reflected from the dichroic film into the light in the second wavelength range, the light in the second wavelength range transmits through the first prism and reflected from the second DMD into the second light, and the second light is incident to the first prism, reflected from the dichroic film, and emits out of the first prism to form the image light with the first light.

3. The projection device of claim 2, further comprising:

at least one optical element, wherein the at least one optical element directs the illumination light to the first prism, and the at least one optical element comprises one or more lenses, reflective mirrors, prisms, or a combination thereof.

4. The projection device of claim 1, further comprising:

a first dichroic member configured to reflect the first color light and allow the second color light and the fourth color light to partially transmit therethrough; and a second dichroic member configured to reflect the third color light and allow the fourth color light to transmit therethrough, wherein:

the first color light is reflected from the first dichroic member to the first wavelength conversion unit to generate the second color light, the second color light transmits through the first dichroic member to travel toward the light-combining element, and the first color light not converted by the first wavelength conversion unit transmits through the first wavelength conversion unit to travel toward the light combining element;

the third color light is reflected from the second dichroic member to the second wavelength conversion unit to generate the fourth color light, the fourth color light transmits through the second dichroic member to travel toward the light-combining element, and the third color light not converted by the second wavelength conversion unit transmits through the second wavelength conversion unit to be reflected by the first dichroic member and the second dichroic member to the light-combining element.

5. The projection device of claim 1, further comprising:

a first dichroic member configured to reflect the first color light and allow the second color light and the fourth color light to partially transmit therethrough; and a second dichroic member configured to reflect the third color light and allow the fourth color light to transmit therethrough, wherein:

the first color light is reflected from the first dichroic member to the first wavelength conversion unit to generate the second color light, the second color light transmits through the first dichroic member to travel toward the light-combining element, and the first color light not converted by the first wavelength conversion unit is reflected from the first wavelength conversion unit to bypass the first dichroic member toward the light-combining element;

the third color light is reflected from the second dichroic member to the second wavelength conversion unit to generate the fourth color light, the fourth color light transmits through the second dichroic member to travel toward the light-combining element, and the third color light not converted by the second wavelength conversion unit transmits through the second wavelength conversion unit to be reflected by the first dichroic member and the second dichroic member to the light-combining element.

6. The projection unit of claim 1, wherein the first color light and the third color light fall in a same wavelength range with different polarities, and the second color light and the fourth color light fall in a same wavelength range.

7. The projection device of claim 1, further comprising:

a first dichroic member configured to reflect the first color light and allow the second color light and the fourth color light to partially transmit therethrough; and a second dichroic member configured to reflect the third color light and allow the fourth color light to transmit therethrough, wherein:

the first color light is reflected from the first dichroic member to the first wavelength conversion unit to generate the second color light, the second color light transmits through the first dichroic member to travel toward the light-combining element, and the first color light not converted by the first wavelength conversion unit transmits through the first wavelength conversion unit to be reflected from the first dichroic member toward the light-combining element;

the third color light is reflected from the second dichroic member to the second wavelength conversion unit to generate the fourth color light, the fourth color light transmits through the second dichroic member and is then reflected from the dichroic member toward the light-combining element, and the third color light not converted by the second wavelength conversion unit is reflected from the second wavelength conversion unit to the first dichroic member and further reflected from the first dichroic member to the light-combining element.

8. A projection device for providing an image light, comprising:

a light source module configured to provide an illumination light;

a dichroic film configured to allow a first portion of the illumination light to transmit therethrough to form a light in a first wavelength range and to reflect a second portion of the illumination light into a light in a second wavelength range different from the first wavelength range;

a first digital micromirror device (DMD) configured to reflect the light in the first wavelength range from the dichroic film into a first light; and a second DMD configured to reflect the light in the second wavelength range from the dichroic film into a second light, wherein the first light and the second light together form the image light, wherein the light source module comprises:

a first light source configured to provide a first color light;

a first wavelength conversion unit configured to convert the first color light into a second color light, the first color light and the second color light falling in different wavelength ranges;

a second light source configured to provide a third color light;

a second wavelength conversion unit configured to convert a portion of the third color light into a fourth color light, the third color light and the fourth color light falling in different wavelength ranges; and a light-combining element configured to combine the second color light, the third color light not converted by the second wavelength conversion unit, and the fourth color light to form the illumination light.

9. The projection device of claim 8, further comprising:

a dichroic member configured to reflect the first color light and the third color light and allow the second color light and the fourth color light to partially transmit therethrough, wherein:

the first color light is reflected from the dichroic member to the first wavelength conversion unit to generate the second color light, and the second color light partially transmits through the dichroic member to travel toward the light-combining element;

the fourth color light is partially reflected from the dichroic member toward the light-combining element, and the third color light not converted by the second wavelength conversion unit is reflected from the dichroic member to the light-combining element.

10. The projection device of claim 9, wherein the dichroic member is configured to reflect blue light and red light and allow green light to transmit therethrough, or configured to reflect blue light and green light and allow red light to transmit therethrough, and wherein the first color light and the third color light are blue lights, and the second color light and the fourth color light are yellow lights.

11. The projection unit of claim 4, wherein the first color light and the third color light fall in a same wavelength range with different polarities, and the second color light and the fourth color light fall in a same wavelength range.

12. The projection unit of claim 5, wherein the first color light and the third color light fall in a same wavelength range with different polarities, and the second color light and the fourth color light fall in a same wavelength range.

13. The projection device of claim 8, further comprising a first prism and a second prism, wherein the dichroic film is disposed between the first prism and the second film, and the illumination light is incident to the first prism, wherein:

the first portion of the illumination light transmits through the dichroic film to form the light in the first wavelength range, the light in the first wavelength range transmits out of the second prism and is reflected from the first DMD into the first light, and the first light is incident to the second prism, transmits through the dichroic film, and emits out of the first prism; and the second portion of the illumination light is reflected from the dichroic film into the light in the second wavelength range, the light in the second wavelength range transmits through the first prism and reflected from the second DMD into the second light, and the second light is incident to the first prism, reflected from the dichroic film, and emits out of the first prism to form the image light with the first light.

14. The projection device of claim 13, further comprising:

at least one optical element, wherein the at least one optical element directs the illumination light to the first prism, and the at least one optical element comprises one or more lenses, reflective mirrors, prisms, or a combination thereof.

* * * * *